United States Patent [19]

van der Lely

[11] Patent Number: 5,713,301
[45] Date of Patent: Feb. 3, 1998

[54] CONSTRUCTION FOR AUTOMATICALLY MILKING ANIMALS

[76] Inventor: Cornelis van der Lely, 7, Brüschenrain, CH-6300 Zug, Switzerland

[21] Appl. No.: 537,111

[22] PCT Filed: Mar. 29, 1994

[86] PCT No.: PCT/NL94/00066

[87] PCT Pub. No.: WO94/22292

PCT Pub. Date: Oct. 13, 1994

[30] Foreign Application Priority Data

Apr. 1, 1993 [NL] Netherlands ............ 9300578

[51] Int. Cl.$^6$ ...................................... A01J 5/00
[52] U.S. Cl. .................. 119/14.02; 119/14.18; 119/14.1
[58] Field of Search ............. 119/14.02, 14.08, 119/14.1, 14.13, 14.11, 14.18

[56] References Cited

U.S. PATENT DOCUMENTS

| | | | |
|---|---|---|---|
| 3,603,292 | 9/1971 | Finch | 119/14.1 |
| 3,726,252 | 4/1973 | Needham et al. | 119/14.08 |
| 4,726,322 | 2/1988 | Torsius | 119/14.14 |
| 4,805,557 | 2/1989 | van der Lely et al. | 119/14.08 |
| 4,805,559 | 2/1989 | van der Lely et al. | 119/14.1 |
| 4,838,207 | 6/1989 | Bom et al. | 119/14.02 |
| 4,936,256 | 6/1990 | Pera | 119/14.08 |
| 5,020,477 | 6/1991 | Dessing et al. | 119/14.08 |
| 5,042,428 | 8/1991 | Van Der Lely et al. | 119/14.08 |
| 5,069,160 | 12/1991 | Street et al. | 119/14.08 |
| 5,080,040 | 1/1992 | van der Lely et al. | 119/14.09 |

FOREIGN PATENT DOCUMENTS

| | | |
|---|---|---|
| 0 302 559 A1 | 2/1989 | European Pat. Off. . |
| 306 579 A | 3/1989 | European Pat. Off. ............ 119/14.08 |
| 309 036 A | 3/1989 | European Pat. Off. ............ 119/14.08 |
| 320 496 A | 6/1989 | European Pat. Off. ............ 119/14.08 |
| 360 354 A | 3/1990 | European Pat. Off. ............ 119/14.08 |
| 0 448 132 A3 | 9/1991 | European Pat. Off. . |
| 0 532 066 A1 | 3/1993 | European Pat. Off. . |
| 4113700 A | 10/1992 | Germany ............ 119/14.08 |
| 2 226 941 | 7/1990 | United Kingdom ............ 119/14.08 |
| WO 93/00001 | 1/1993 | WIPO ............ 119/14.08 |

OTHER PUBLICATIONS

Samenwerkingsverdrag (PCT), Form PCT/ISA/201(a) 07.1979, dated Nov. 2, 1993 (Untranslated).
International Search Report (PCT), Form PCT/ISA/210, dated Aug. 5, 1994.
International Preliminary Examination Report (PCT), Form PCT/IPEA/409, dated Jun. 19, 1995.

*Primary Examiner*—Robert P. Swiatek
*Assistant Examiner*—Yvonne R. Abbott
*Attorney, Agent, or Firm*—Penrose Lucas Albright

[57] ABSTRACT

An apparatus and method for automatically milking animals utilizing a milking compartment and milking robot is presented. The milking robot has a plurality of carriers or robot arms which carry at least one teat cup, each at the end thereof. The teat cups are connected to the carriers via a flexible connecting element, such as a flexible cable or cord, and a piston/cylinder arrangement which is preferably pneumatic. By connecting the teat cups to their carries in this manner, the carriers may be withdrawn from the teat cups, after the teat cups have been connected to the teats of an animal, so that the teat cups are unfixed in relation to the carriers. Thus, an animal being milked has greater freedom of movement within the milking compartment. The teat cups are returned to the carriers, after milking, to be substantially rigidly secured thereto. The milking robot is further capable of pivoting from and to the inside the milking compartment.

38 Claims, 6 Drawing Sheets

CONSTRUCTION FOR AUTOMATICALLY MILKING ANIMALS

RELATED APPLICATIONS

This Patent Application is a Continuation of PCT/NL94/00066 (filed Mar. 29, 1994 designating the United States), which claims the priority date of The Netherlands' Patent Application 9300578, filed Apr. 1, 1993.

FIELD OF THE INVENTION

The present invention relates to an apparatus for automatically milking animals, such as cows, comprising a milking robot with teat cups which can be connected to the teats of an animal. In particular, the implement is characterized in that the teat cups are non-rigidly connected to their respective carriers, that there are at least two carriers, and the carriers are pneumatically movable in at least two directions.

BACKGROUND OF THE INVENTION

The art of automation for the dairy industry has disclosed many implements for automatically milking animals, such as cows.

One such implement is known from European Patent No. EP-A-O 532 066. This document discloses robot for an automatic milking machine comprising four telescopic arms for attaching all four teat cups to the animal's teats. These four arms slide along a rotary shaft so that, once they reach a certain height, they can position the teat cups following polar coordinates. They are connected to a common frame wherein they are individually movable in an upward and downward direction. Further, these robot arms are movable in a horizontal plain. The frame as a whole is movable whereby the robot arms are movable from the rear side of an animal to between its hind legs, particularly by means of the telescopic supporting structure. In other words, they are designed to be introduced between both hind legs of the animal which can lead to the animal's discomfort, especially if the hind legs are naturally close to each other, since for the animal, this requires a rather unnatural situation, whereby the animal's hind legs are forced in a spread position.

Another such implement is disclosed in European Patent Number EP-A1-0 306 579, wherein two robot arms, which include teat cups, are arranged on either side of the milking compartment. The carriers are individually movable from a rest position, obliquely disposed in the milking compartment, to a working position under the animal's udder and extending in at least two different directions. However, each of these robot arms carries only one teat cup, with the consequence that two further robot arms are added. These latter robot arms are mounted under the floor of the milking parlor. Further, the robot arms on either side of the milking parlor are not movable in a horizontal plane.

SUMMARY OF THE INVENTION

A mechanism for automatically milking animals, in order to improve the efficiency, will provide that the connection of the teat cups to the teats is effected without delay. According to the invention, the apparatus is therefore characterized in that a milking compartment includes at least two carriers with teat cups. These carriers are movable from a rest position to a working position, and can be extended in at least two different directions. As a result thereof, the teat cups near the udder of the animal can be disposed near to each other, without the carriers of the teat cups interfering with each other.

In connection with a further feature of the invention, the teat cups are connected to carriers which are pneumatically movable in such a way that, during milking, the teat cups can be moved back and forth by the air in the pneumatic system. This configuration allows the animal to move back and forth in the milking compartment during milking.

In accordance with a still further feature of the invention, during milking, the carriers of the teat cups are arranged in an approximately horizontal plane in the shape of a star around the udder of an animal. This star-shaped configuration of the carriers carrying the teat cups around the udder of the animal results in an advantageous connection of the cups to the teats.

In accordance with yet a further feature of the invention, a plurality of carriers are present for one or more teat cups, of which, during milking, at least one carrier is in a position behind a hind leg of an animal and at least one other carrier in front of a hind leg of this animal. Using the carriers in this manner has the advantage that the carriers disposed around the udder can approach the udder from directions which are away from each other.

In accordance with a still further feature of the invention, carriers are attached to the milking compartment on both sides of the milking compartment. More in particular, the invention relates to a construction, which is characterized in that of the four teat cups, are attached to one carrier. Such a carrier for one or more teat cups being capable of being moved from both a rest position, preferably outside the milking compartment, to a working position. The carrier in this working position, being movable in a predominantly horizontal plane in two different directions which are preferably perpendicular to each other. The adjusting means of the carriers, provided for this purpose, are disposed remotely from the udder of the animal, preferably near the wall of the milking compartment; such a construction enables an accurate and fast manner of coupling of the teat cups to the teats, while, if so desired, two or even all four of the teat cups can be coupled to the teats simultaneously.

According to the invention, a flexible connecting element, such as a cable or a cord, is utilized for connecting a teat cup to a carrier. Thus, a teat cup is connected, in a freely movable manner, to a relevant carrier dining milking and, after milking, it can be pulled against the end of this carrier. By connecting the teat cups to theft respective carrier in this manner, the teat cups are capable of free motion in respect to their respective carriers, i.e. no lateral or other forces (other than forces directly attributed to milking) are exerted on the teats and the animal is in a comfortable position for being milked by the milking robot. In accordance with a further feature of the invention, each teat cup is provided at its side, with a bulge which can be pulled with the aid of a flexible connecting element into a correspondingly shaped recess in the end of a carrier. This measure renders it possible to pull the teat cup, which during milking can move freely with respect to a carrier, in a defined position against the carrier after milking.

The invention further relates to a method for automatically milking animals, such as cows, utilizing an apparatus which comprises a milking compartment and a milking robot with teat cups. The method being further characterized in that the teat cups are moved separately, in pairs of all simultaneously, from a rest position to a working position. In this working position the carriers of the teat cups are moved in at least two different directions (in an approximately horizontal plane) to under the udder of an animal in order to enable connection of the teat cups to the teats of the animal by an upward motion. More specifically, the feature that the teat cups with carrier arms can simultaneously be coupled from different directions to the teats of the animal renders it possible to realize a fast and advantageous coupling of the teat cups.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENTS

Figure 1:
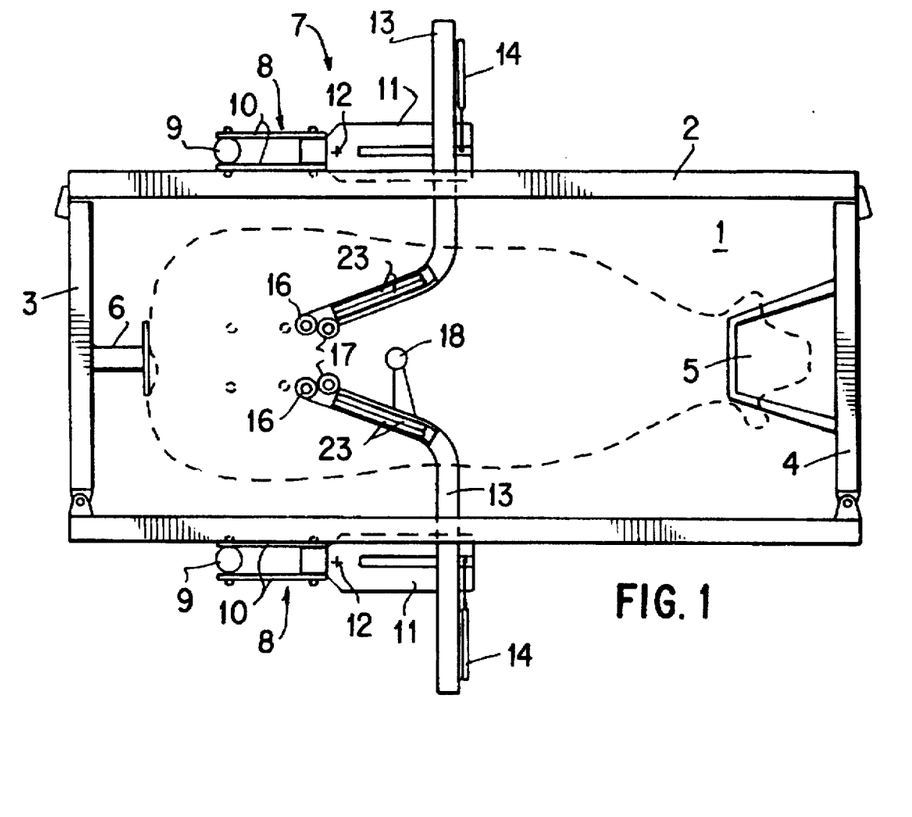
FIG. 1 is a plan view of a milking compartment, in accordance with an embodiment of the invention.
Figure 2:
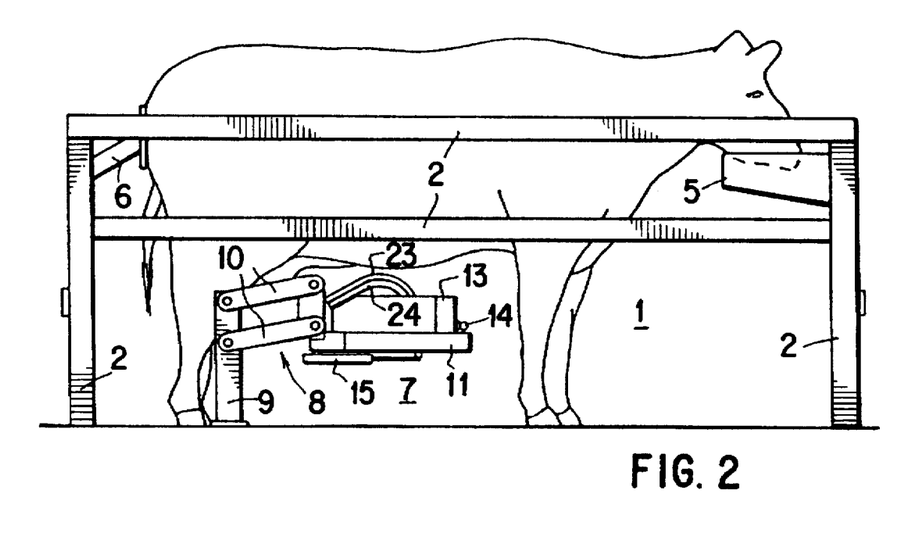
FIG. 2 is an elevational view of the milking compartment shown in FIG. 1.

FIGS. 1 and 2 show a plan view and a side view, respectively, of milking compartment 1 which is formed by frame 2, which constitutes the two sides of the milking compartment 1, door 3, via which an animal to be milked can enter milking compartment 1, and door 4, through which a milked animal can exit milking compartment 1. Attached to door 4 there is feed trough 5 which forms part of an automatic feeding system (not shown) for supplying concentrate. Door 3 is equipped with positioning means 6 for retaining an animal present in milking compartment 1 in a more or less defined position. The milking compartment 1 is provided with milking robot 7 which, in this embodiment, comprises two robot arm constructions 8, which are arranged on either side of milking compartment 1. Robot arm constructions 8 are shown only schematically and include vertically arranged pillar 9, to the upper part of which parallelogram construction 10 is attached, and supporting element 11, which is movable in height with the aid of this parallelogram construction 10. In addition, supporting element 11 is pivotal about vertical shaft 12. By means of supporting element 11, carrier is arranged whereby it can be extended in two directions, which are perpendicular to each other, and in a horizontal plane. Although the motional means for moving supporting element 11 in the vertical direction with the aid of parallelogram construction 10 and the motional means for pivoting same about vertical shaft 12 are not shown in the drawings, such means, such as pneumatic piston/cylinder arrangements, are well known to those skilled in the art and may be utilized. The means with the aid of which carrier 13 is movable with respect to supporting element 11 in two directions which extend perpendicularly to each other are, however, indeed shown. This latter motional means is preferably constituted by pneumatic piston/cylinders 14 and 15. Piston/cylinder sets 14 and 15 act as a kind of spring to allow a limited freedom of motion of carrier 13, more specifically when it comes in some way or another in contact with the animal in a rough manner. Carrier 13 is shaped to extend in two directions. FIG. 1 shows that portion of the carrier 13 that is connected to supporting element 11 extends in a horizontal plane transversely to the longitudinal direction of milking compartment 1, whereas the other end of carrier 13 extends in a horizontal plane obliquely rearwardly and inwardly. Such a construction of carriers 13 allows an easy access to the teats of the animal without being obstructed by the legs and without carriers 13 of the teat cups interfering with each other. In this embodiment, each of carriers 13 is suitable for carrying two teat cups 16 and 17. Because of the use of two carriers 13 of a very specifically chosen design and by arranging carriers 13 on both sides of milking compartment 1, simultaneous coupling of two teat cups 16 and 17 to two teats is possible, as a result of which the period of time for coupling the teat cups to the teats can be significantly reduced. One of carriers 13 is equipped with detection device 18, such as one utilizing a laser. Detection device 18 is disposed in such a manner that, when carrier 13 (to which detection device 18 is attached) has been moved to under the animal in the position shown in FIG. 1, detection device 18 is located approximately in the midway point under the animal at the leading side of the udder. With the aid of detection device 18, which is disposed in such a manner that it reciprocates or rotates about a vertical shaft, it is possible to determine the position of the four teats with respect to carrier 13 (to which detection device 18 is connected). With the aid of piston/cylinders 14 and 15, carrier 13 (to which detection device 18 is connected) can be moved, until the position of a teat, determined by detection device 18, (with respect to detection device 18) corresponds to the position of a relevant teat cup on last-mentioned carrier 13 (with respect to detection device 18). For the placement of other carrier 13, the relative position of carrier 13 (to which detection device 18 is connected) and the relative position, measured with the aid of detection device 18, of the relevant teats with respect to carrier 13 to which detection device 18 is connected must be taken into account.

Carriers 13 are, at least partly, of a tubular design and comprise a piston/cylinder set (not shown). One end of this piston/cylinder set is connected to a respective teat cup 16 or 17 via flexible connecting element 19. Flexible connecting element 19, which may be constituted by a cord or a cable, renders it possible for the connected teat cup to remain, during milking, in connection in a freely movable manner with the relevant carrier 13. More specifically by refraining from energizing, during milking, the piston/cylinder set to which flexible connecting element 19 is connected and which is disposed in tubular carrier 13, the respective teat cup 16 or 17 remains connected, in a freely movable manner, to its respective carrier 13. After milking, by energizing the last-mentioned piston/cylinder set, respective teat cup 16 or 17 can be pulled up against the end of carrier 13. When carrier 13 has been moved such with the aid of piston/cylinder sets 14 and 15 that one of the teat cups, say teat cup 16, has been moved to under a relevant teat and is connected thereto, then, after releasing the piston/cylinder set in tubular carrier 13, carrier 13 can be moved in such a manner that the other teat cup, say teat cup 17, connected to this carrier is moved to under another teat for connection to said teat.

With reference to FIGS. 3–7, it will be described how the teat cups 16 and 17, each of which are connected to each carrier 13, can be connected to the teats of an animal in animal in milking compartment 1.

Figure 3:
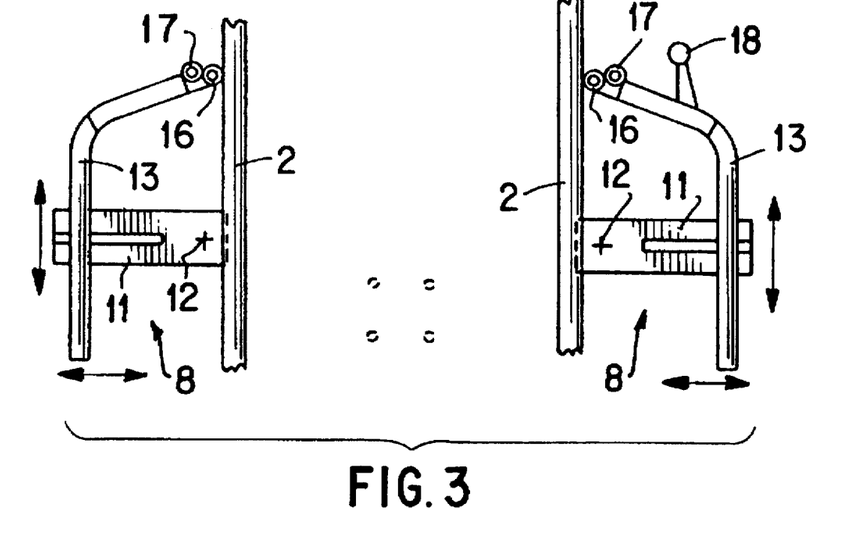
FIGS. 3–7 show the consecutive positions occupied by the carriers for coupling of the teat cups.
Figure 4:
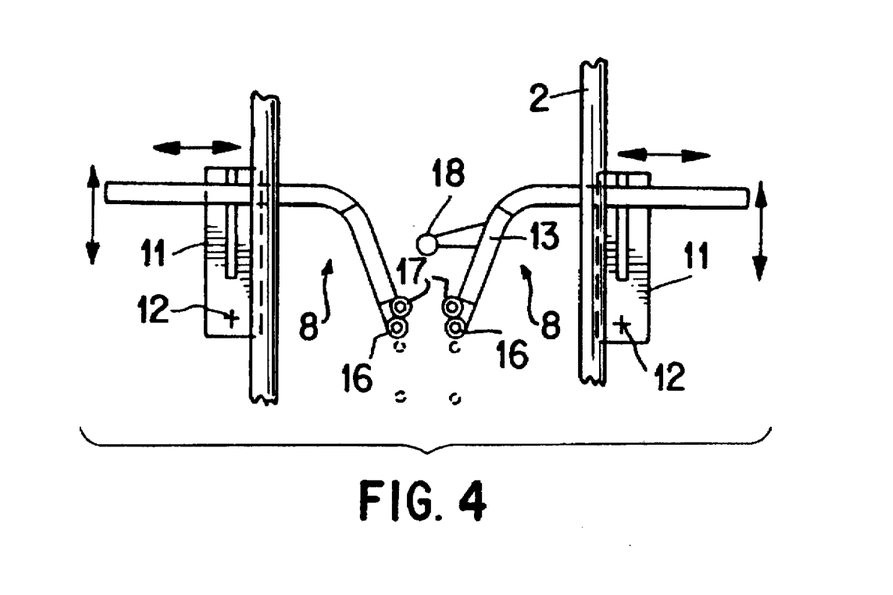
Figure 5:
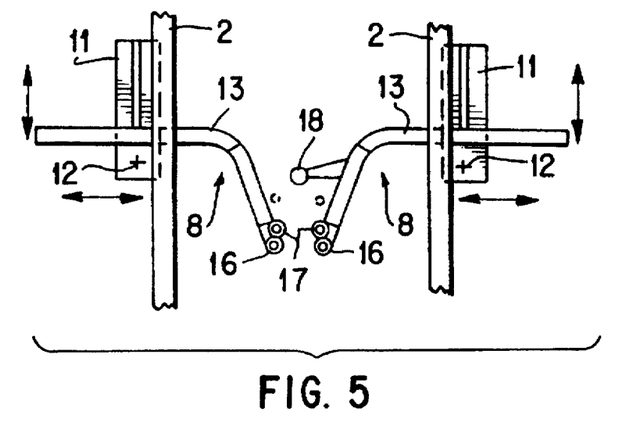
Figure 6:
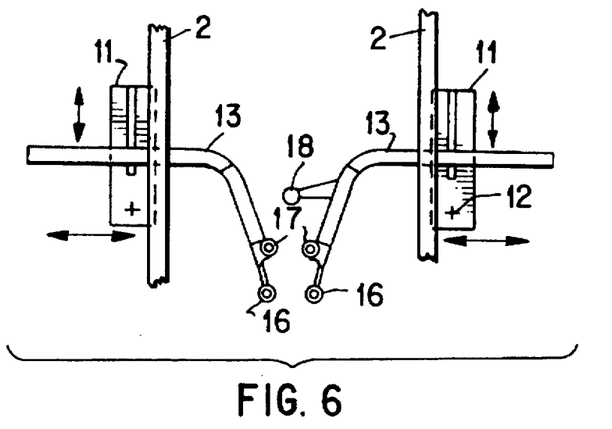
Figure 7:
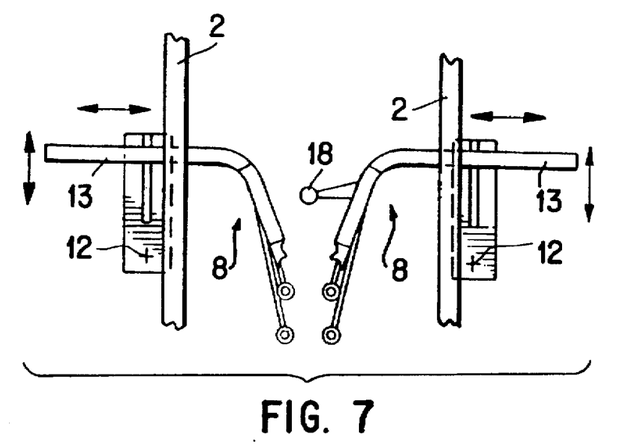

In FIG. 3, two robot arm constructions 8 are disposed on both sides of milking compartment 1 in the rest condition. In this condition, an animal to be milked can enter milking compartment 1; supporting element 11 has then been pivoted in such a manner about vertical shaft 12 that supporting element 11 extends outwardly transversely to the longitudinal direction of milking compartment 1. Carriers 13 with teat cups 16 and 17 are then completely outside milking compartment 1. By pivoting supporting element 11 through 90° about shaft 12, carriers 13 with teat cups 16 and 17 are moved to under the animal (not shown) standing in milking compartment 1. In this situation, which is shown in FIG. 4, detection device 18 is in a position approximately in the midway point under the animal, more specifically at the leading side of the udder of this animal. Carriers 13 can now be moved, individually or simultaneously in two directions which are perpendicular to each other, so that teat cups 16 arrive under the rear teats of the animal, and so that only an upward motion of teat cups 16 is sufficient to connect them to these teats. This situation is shown in FIG. 5. Thereafter, the relevant piston/cylinder sets contained in respective tubular carriers 13, of which each cylinder connected to its corresponding teat cup 16 via flexible connecting element 19, are released, so that carriers 13 can be advanced without pulling teat cups 16 from the teats. Carriers 13 are now moved so that teat cups 17 arrive under the leading teats of the animal, whereafter teat cups 17 can be connected individually or simultaneously by an upward motion to the leading teats of the animal. This situation is shown in FIG. 6. Thereafter, the piston/cylinder sets contained in their respective tubular carriers 13, each piston/cylinder set of which is connected via flexible connecting element 19 to teat cup 17, are de-energized, so that carriers 13 can be advanced, resulting in that all four teat cups 16 and 17 continue to be in a flexible connection with their respective carriers 13, so that during milking the animal has some motional freedom without the risk that teat cups 16 or 17 could be pulled from the teats, which might be the case when a rigid connection of the teat cups to the carriers was used. The latter situation of the instant invention is shown in FIG. 7.

Figure 8:
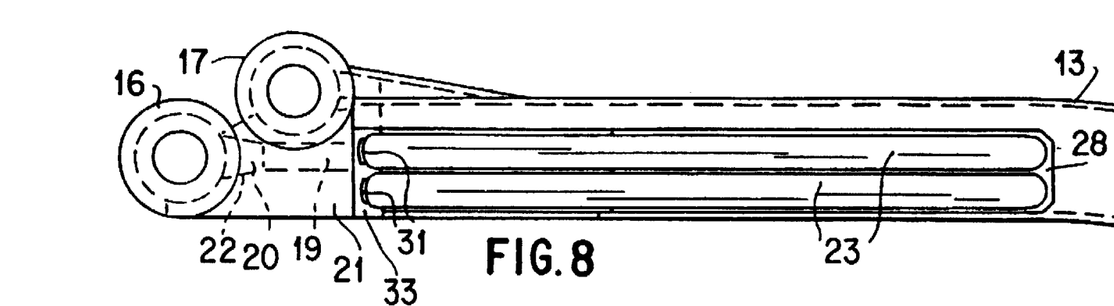
FIG. 8 is a plan view of the end section of a carrier for two teat cups.
Figure 9:
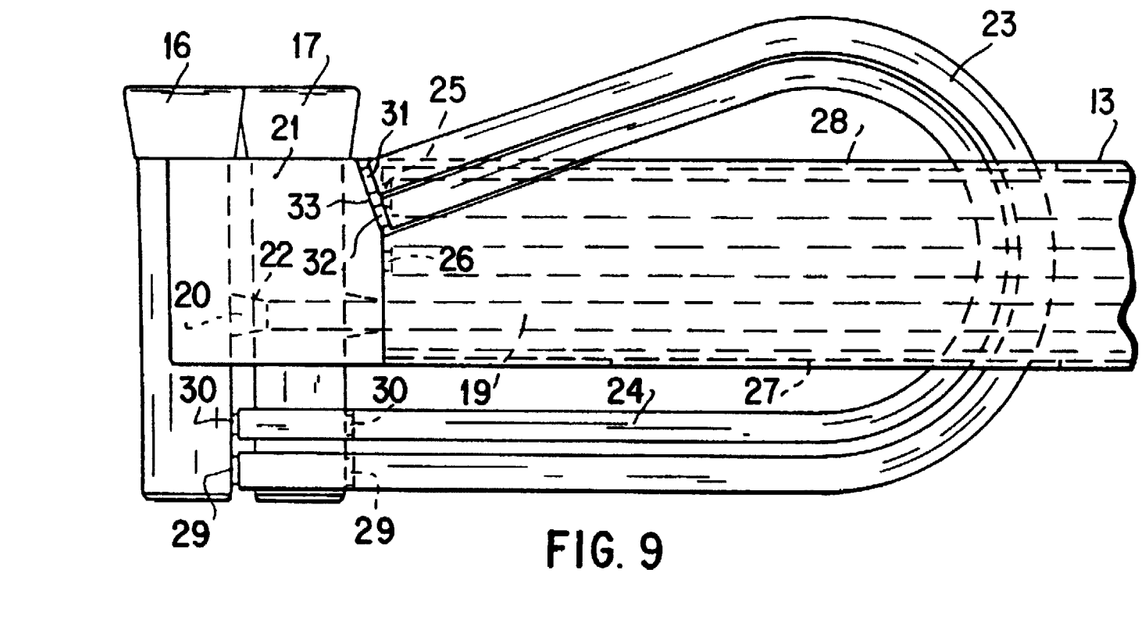
FIG. 9 is an elevational view of the carrier end section shown in FIG. 8.

FIGS. 8 and 9 show in a plan view and a side view, respectively, how two teat cups 16 and 17 are connected to the end of a carrier 13. At it side, each teat cup is provided with a bulging portion, preferably conical bulge 20, to which flexible connecting element 19 is connected. That end of carrier 13 that is located near the teat cups is provided with through-connection element 21. Through-connection element 21 has at its exterior side two recesses 22, the shape of which corresponds to conical bulge 20 at the side of teat cups 16 and 17. Conical recess 22 has a through-bore through through-connection element 21, through which relevant flexible connecting element 19 is passed, so that when this flexible connecting element 19 is tightened, conical bulge 20 at the side of the relevant teat cup is pulled into relevant conical recess 22 in through-connection element 21. Through-connection element 21 also serves for the through-connection of the milk and/or pulsation tube leading to a teat cup. Milk tube 23 and/or pulsation tube 24 are passed from appropriates points beyond the scope of this description, through tubular carrier 13, to respective points of connection 25 and 26 provided for that purpose in through-connection element 21. In addition, milk tube 23 and pulsation tube 24, if present, must be of a flexible construction between through-connection element 21 and teat cups 16 and 17. For that purpose, the end-part of tubular carrier 13 is provided at both the bottom side and the upper side with slotted apertures 27 and 28, respectively. From connecting points 29 and 30 of the teat cups, milk and pulsation tubes 23 and 24 extend one above the other, passing underneath the end of carrier 13 and thereafter are passed upwardly through carrier 13 through slotted aperture 27 at the bottom side of carrier 13 and via slotted aperture 28 at the upper side of the carrier 13, in a loop shape over and along carrier 13 forwardly and downwardly to connecting points 31 and 32 at the rear side of through connection element 21; to that end, this rear side is provided with beveled plane 33. The size and the flexibility of the loop-shaped section of milk and/or pulsation tube 23 and 24, respectively, between teat cups 16 and 17 and through-connection element 21 in the tubular carrier 13, together with the length of flexible connecting element 19 and the stroke of the piston/cylinder set connected to flexible connecting element 19, determine, once the teat cups have been connected to the teats, the extent to which carrier 13 can be withdrawn.

Figures 10, 11, 12:
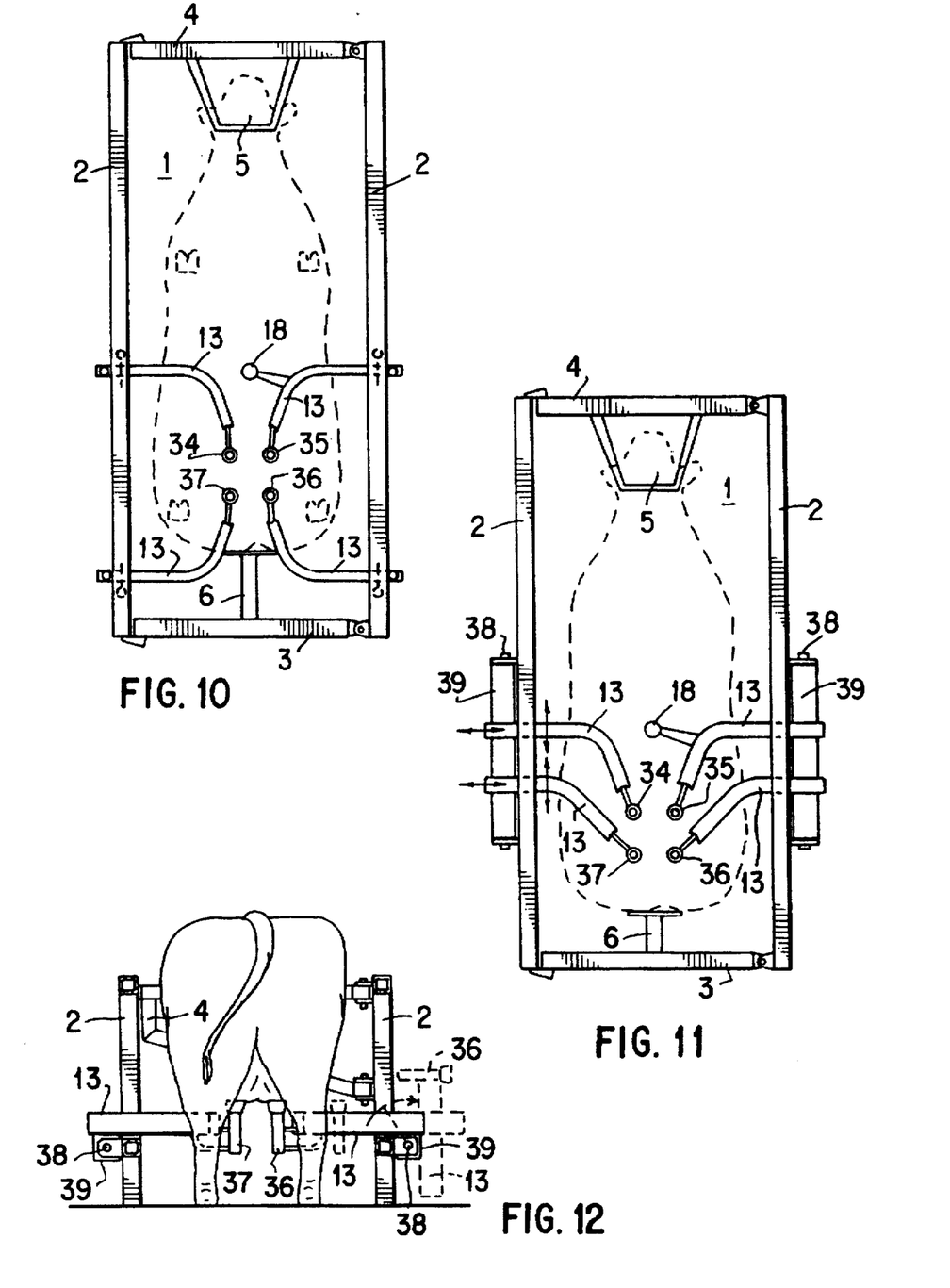
FIG. 10 is a plan view of another embodiment of a milking compartment.
FIG. 11 is a plan view of a further embodiment of a milking compartment.
FIG. 12 is a rear elevational view of the milking compartment shown in FIG. 11.
Figure 13:
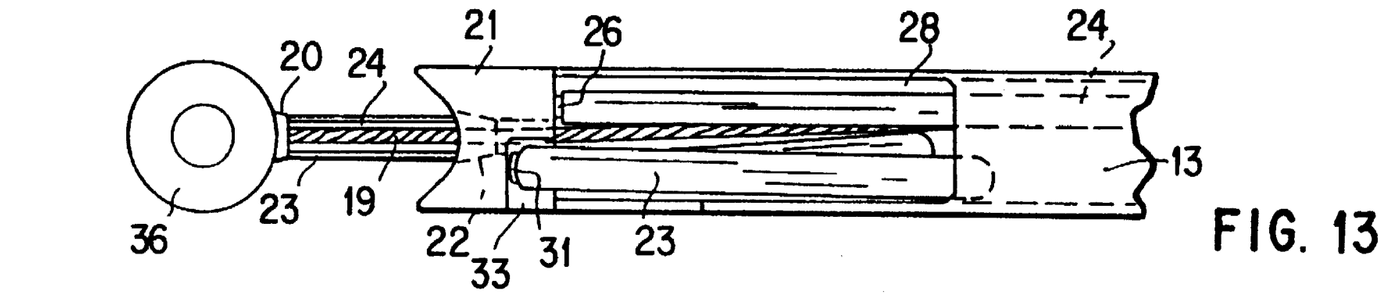
FIG. 13 is a plan view of the end section of a carrier for one teat cup.
Figure 14:
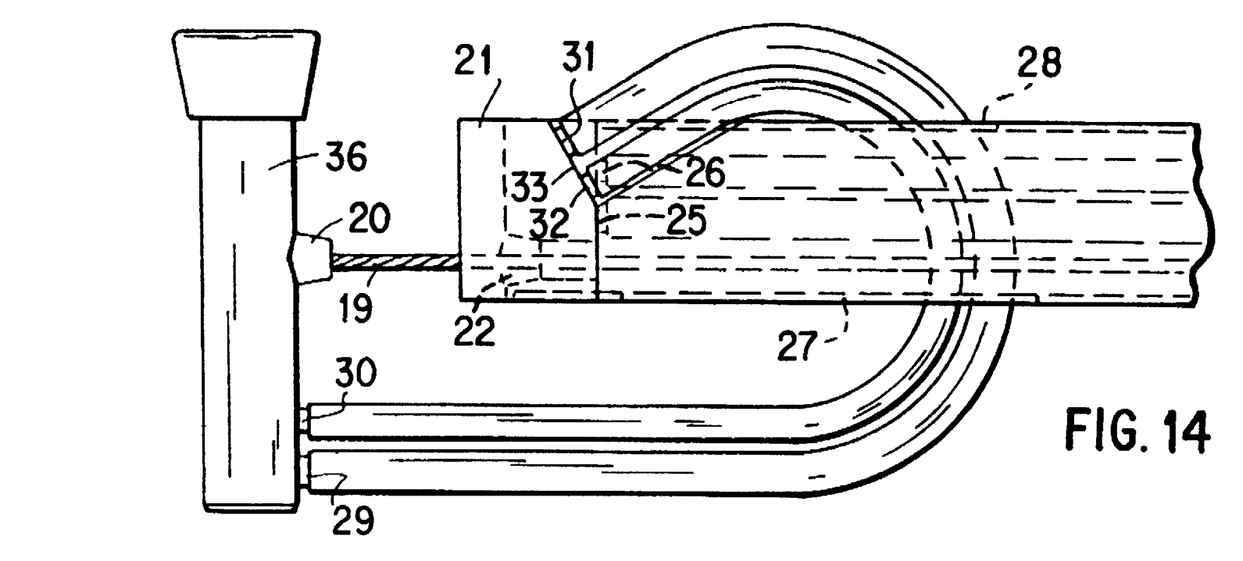
FIG. 14 is a side view of the carrier end section as shown in FIG. 13.

In the embodiments as illustrated in FIGS. 10 and 11, four carriers 13, each for teat cup 34, 35, 36 or 37, respectively, are shown. In both cases, carriers 13 are arranged in the shape of a star and also here extend each in two directions. In a similar manner as shown in FIG. 1, one of carriers 13 is equipped with detection device 18. In the embodiment shown in FIG. 10, carriers 13 are arranged such that carriers 13 with teat cups 34 and 35, which are to be connected to the leading teats of the animal, approach the udder from the side of milking compartment 1 and pass between the from and hind legs, whereas the carriers with teat cups 36 and 37 which are intended for connection to the rear teats, move to under the animal passing between the two hind legs. In this embodiment, carriers 13 are still further remote from each other and can easily be moved to under the animal independently of each other, both individually and simultaneously, without interfering with each other. As is also the case in FIG. 1, carriers 13 may again have been disposed such that they are movable in two directions and moreover are arranged pivotally near the exterior wall of milking compartment 1. A similar construction as shown in FIG. 1 is then presented. In FIG. 11, two carriers 13, each carrying one teat cup for a leading and one for a trailing teat, are each moved to under the udder of the animal from a respective side of milking compartment 1 passing between a front and a hind leg. This construction is shown in a rear view in FIG. 12. In this situation, carriers 13 are pivotal about a horizontal pivot shaft 38 which extends in the lengthwise direction of milking compartment 1 and, in the embodiment shown, is disposed just next to longitudinal side wall 2 of milking compartment 1. Also in this case, carriers 13 are movable in both the lengthwise direction of milking compartment 1 and in the direction transversely thereto. Supporting element 39, ohm which the carriers 13 have been disposed, is pivotal about shaft 38. In the rest position, carriers 13 are in a vertical position outside milking compartment 1. Carriers 13 are moved in a horizontal plane by having them perform a pivotal motion about horizontal shaft 38, in which plane the teat cups can be displaced in both the transverse direction and in the lengthwise direction of milking compartment 1 for being moved to under the teats of the animal. The connection of each of teat cups 34–37 to carrier 13 is here similar to the manner which in FIGS. 8 and 9 two teat cups are coupled to carrier 13. The connection of one teat cup 34 and one carrier 13 is shown in FIGS. 13 and 14. Also in this case, teat cup 36 is provided at its side with conical bulging portion 20, to which flexible connecting element 19 is secured, and with the aid of this flexible connecting element 19 conical bulging portion 20 can be pulled into recess 22 of through connection element 21. To that end, also recess 22 has a through-bore for flexible connecting element 19. Also in this case, carrier 13 is provided at both the bottom and the upper side with respective slotted apertures 27 and 28, so that milk tube 23 and/or pulsation tube, respectively, can be passed at the bottom side of carrier 13 through carrier 13 in the upper direction and through slotted aperture 28 in the upper side of carrier 13 and be connected in the shape of a loop to through-connection element 21 in a similar manner as shown in FIG. 9. Obviously, it also holds here that, when teat cup 36 has been connected to a teat and carrier 13 is withdrawn, the extent to which carrier 13 can be withdrawn is determined by the nature of the loop in the milk 23 and/or pulsation 24 tube, more in particular by the flexibility of the material of both tubes, and of course the length of flexible connecting element 19 and the stroke of the piston/cylinder set connected thereto in carrier 13. The manner of coupling a cup to a teat and the withdrawing mechanism of a cup on carrier arm 13 are similar to those in the embodiment illustrated in FIGS. 8 and 9.

The invention is not limited to the embodiments described and shown here, but also relates to all kinds of modifications, of course insofar they are within the scope of the accompanying claims.

I claim:

1. An apparatus for automatically milking an animal comprising a milking robot and a milking compartment, said milking compartment comprising a framework which defines an area for confining an animal while being milked, said milking robot comprising a plurality of carriers, each carrier of said plurality of carriers supporting a teat cup connected thereto, said plurality of carriers being movable from a rest position proximate a lateral side of said framework to a working position under the udder of the animal to be milked, each said carrier comprising first extensible means for laterally linearly extending and withdrawing such carrier in a first direction into and from said milking compartment and a second extensible means linearly extending such carrier in a second direction within said milking compartment which is distinct from said first direction.

2. An apparatus as claimed in claim 1, wherein each said carrier is disposed substantially horizontally.

3. An apparatus as claimed in claim 1, wherein each said carrier comprises a flexible tube for receiving milk from said animal, said tube being substantially curved in an U-shape when viewed in side elevation.

4. An apparatus as claimed in claim 1, wherein each said carrier further comprises a pneumatically activated reciprocating system, said pneumatically activated reciprocating system interconnected with said teat cup whereby said teat cup is provided with a means of selectively being deployed from or retracting to said carrier.

5. An apparatus as claimed in claim 1, wherein said carriers divaricate relative to each other and relatively from an udder of said animal when said carriers are in said working position.

6. An apparatus as claimed in claim 1, wherein said plurality of carriers comprises four carriers, said carriers disposed in their rest position outboard of two longer sides of said milking compartment, two said carriers to each said side.

7. An apparatus as claimed in claim 1, further comprising a detection device, said detection device being connected at least to one carrier of said plurality of carriers whereby the position of the teats of an animal is determined.

8. An apparatus as claimed in claim 7, wherein said detection device is disposed under an animal forward of said animal's udder when said carriers are in said working position and said teat cups are under said udder.

9. An apparatus as claimed in claim 1, wherein each of said carriers comprises a tubular structure, each said carrier as seen in plan being non-linear whereby when in its working position is generally perpendicular to said lateral side and in the vicinity of the animal's udder is more nearly parallel to said lateral side.

10. An apparatus as claimed in claim 9, wherein said connection between said teat cup and said carrier comprises a pliant flexible connecting element, said flexible connecting element comprising means for said teat cup to extend from said tubular structure whereby while said teat cup is connected to a teat, said teat cup has relative freedom of movement in respect to said carrier.

11. An apparatus as claimed in claim 10, wherein said flexible connecting element comprises means for being retracting into said tubular structure whereby said teat cup is pulled up against an end of said carrier.

12. An apparatus as claimed in claim 10, wherein said flexible connecting element is disposed in said tubular structure of said carrier.

13. An apparatus for automatically milking an animal comprising a framework for confining the animal when it is being milked, a milking robot, said milking robot comprising a plurality of carriers, each of said carriers being supported proximate a lateral side of said framework and being movable from proximate said framework to under the udder of the animal confined by said framework, each carrier of said plurality of carriers connected to a teat cup, said teat cup being connected to said carrier via a pneumatically activated reciprocating system whereby said teat cup is selectively extendable from or retractable to said carrier.

14. An apparatus as claimed in claim 13, wherein said carriers are substantially entirely disposed in a substantially horizontal plane when in said working position proximate an udder of said animal.

15. An apparatus for automatically milking an animal comprising a milking compartment, a milking robot which includes carriers, teat cups, and means for positioning said teat cups to teats of said animal, said carriers each comprising a first end and second end, each said first end connected to a respective said teat cup, each said first end being movable in response to said means for positioning said teat cups to operate in said milking compartment, each said second end being located and said first and second ends being continuously disposed in substantially the same horizontal plane laterally outside of said milking compartment.

16. An apparatus for automatically milking an all animal comprising a milking robot and teat cups, said teat cups disposed on said milking robot whereby the upper edges of at least two teat cups are directly against each other.

17. A method of automatically milking an animal that utilizes an apparatus comprising a milking compartment and a milking robot with teat cups, said method comprising moving said teat cups selectively individually, in pairs or simultaneously, from a rest position disposed at a lateral side of said milking compartment to a working position within said milking compartment, moving said teat cups in said working position in at least two different directions and within an approximately horizontal plane to under an udder of said animal, and connecting said teat cups to teats of said animal by an upward motion.

18. A method as claimed in claim 17, wherein said milking robot comprises a plurality of carriers, each said carrier comprising at least one said teat cup, said method further comprising moving said carriers away from said teats while said teat cups are connected thereto whereby said teat cups, while connected to said teats can move freely with respect to said carriers.

19. A method as claimed in claim 18 further comprising pliant flexible connecting elements pulling said teat cups to their said respective carriers when such teat cups are disconnected from their respective teats.

20. An apparatus for automatically milking an animal comprising a milking robot and a milking compartment, said milking compartment comprising a plurality of carriers, each carrier of said plurality of carriers comprising a teat cup, said plurality of carriers being movable from a rest position to a working position, at least one carrier of said plurality of carriers being disposed in said working position from a position proximate an udder of said animal to behind a hind leg of said animal and at least one further carrier of said plurality of carriers being disposed, in said working position, from proximate said udder of said animal to a position in front of a hind leg of said animal.

21. An apparatus for automatically milking an animal comprising a milking robot and a milking compartment, said milking compartment comprising a plurality of carriers, each carrier of said plurality of carriers comprising a teat cup, said plurality of carriers being movable from a rest position to a working position, said plurality of carriers comprising two carriers, each said carrier comprising two of said teat cups, said carriers attached to said milking compartment at two sides thereof, one said carrier to one said side and the other to the other said side.

22. An apparatus for automatically milking an animal comprising a milking robot and a milking compartment, said milking compartment comprising a plurality of carriers, each carrier of said plurality of carriers comprising a teat cup, said plurality of carriers being movable from a rest position to a working position, said carriers being pivoted from said rest position to said working position, and in said working position said carriers being movable in said two directions, said two directions being approximately perpindicular to each other.

23. An apparatus as claimed in claim 22, wherein one said direction is lengthwise to said milking compartment, the other said direction is transverse to said milking compartment.

24. An apparatus as claimed in claim 22, wherein said carriers are disposed on a supporting element, said carriers comprising means of moving in said two directions, said supporting element being disposed pivotally connected to a predominantly vertical shaft, whereby said carrier is movable from said rest position to said working position.

25. apparatus as claimed in claim 24, wherein said supporting element is provided means for adjustable vertical movement.

26. An apparatus as claimed in claim 22, wherein said carriers are disposed on a supporting element, said carriers comprising means of moving in said two directions, said supporting element being disposed pivotally connected to a predominantly horizontal shaft whereby said carrier is movable from said rest position to said working position.

27. An apparatus as claimed in claim 24, wherein said predominantly vertical shalt is disposed at approximately an exterior side of a side wall of said milking compartment.

28. An apparatus as claimed in claim 26, wherein said predominantly horizontal shaft is disposed approximately at an exterior side of a side wall of said milking compartment.

29. An apparatus for automatically milking an animal comprising a milking robot and a milking compartment, said milking compartment comprising a plurality of carriers, each carrier of said plurality of carriers comprising a teat cup, said plurality of carriers being movable from a rest position to a working position, each of said carriers comprising a tubular structure, said connection between each said teat cup and a said carrier comprising flexible connecting element, said flexible connecting element comprising means for said teat cup to extend from said tubular structure whereby while said teat cup is connected to said teat, said teat cup has relative freedom of movement in respect to said carrier, said teat cup comprising at its side a protecting portion and said carrier comprising a corresponding recess shaped to receive said protecting portion, wherein said protecting portion can be pulled into said correspondingly shaped recess with the aid of said flexible connecting element.

30. An apparatus for automatically milking an animal comprising a milking robot and a milking compartment, said milking compartment comprising a plurality of carriers, each carrier of said plurality of carriers comprising a teat cup, said plurality of carriers being movable from a rest position to a working position, each of said carriers comprising a tubular structure, said connection between each said teat cup and a said carrier comprising a flexible connecting element, said flexible connecting element comprising means for said teat cup to extend from said tubular structure whereby while said teat cup is connected to said teat, said teat cup has relative freedom of movement in respect to said carrier near the end of each said tubular carrier, a through-connection element being incorporated in said carrier to accommodate a milk tube and a pulsation tube.

31. An apparatus as claimed in claim 30, wherein said through-connection element further comprises a shaped recess, whereby a teat cup is accepted in said recess when said flexible connecting element retracts said teat cup to said carrier.

32. An apparatus as claimed in claim 30, wherein said milk tube and said pulsation tube connected to said teat cup and connected to said through-connection element are disposed in a bow between said teat cup and said through-connection element.

33. An apparatus as claimed in claim 32, wherein said carrier further comprises a lower slotted aperture and an upper slotted aperture, said lower and said upper slotted apertures accepting said milk tube and said pulsation tube, respectively.

34. An apparatus as claimed in claim 30, wherein said through-connection element accepts milk lines and pulsation tubes of two teat cups and said carrier is provided with two recesses, each which accept a teat cup of said two teat cups.

35. An apparatus as claimed in claim 34, wherein when said two teat cups are retracted to said carrier, they are disposed substantially in contact with each other at the end of said carrier.

36. An apparatus for automatically milking an animal comprising:
a milking compartment and a milking robot,
said milking robot comprising a supporting element,
said supporting element comprising a pivoting means whereby said supporting element is pivoted between a position outside said milking compartment and a position inside said milking compartment,
said supporting element further comprising a vertical motion means whereby said supporting element is moved vertically, said supporting element comprising a carrier,
said carrier comprising a curved arm with two ends, a first end and a second end,
> said carrier further comprising a horizontal motion means whereby said carrier is moved in a horizontal plane in two substantially perpendicular directions,
> said carrier still further comprising a teat cup and a pliant flexible connection means, said teat cup disposed approximately at said first end, said flexible connection means connecting said carrier to said teat cup whereby said teat cup is selectively extended from said first end, and in said extended disposition said teat cup is substantially moveable in respect to said first end, or retracted to said first end, and in said retracted disposition said teat cup is substantially immovable in respect to said first end, said flexible connection means comprising a flexible cord and a piston/cylinder arrangement,
> said piston/cylinder arrangement comprising two operating ends, a first operating end and a second operating end, said first and said second operating ends being selectively extended from each other or drawn toward each other, said second operating end rigid in respect to said carrier, said flexible cord connecting said teat cup and said first operating end.

37. An apparatus as claimed in claim 36 wherein said teat cup is further connected to said carrier via a flexible milk tube.

38. An apparatus as claimed in claim 36 wherein said teat cup is further connected to said carrier via a flexible pulsating pressure tube.

* * * * *